UNITED STATES PATENT OFFICE.

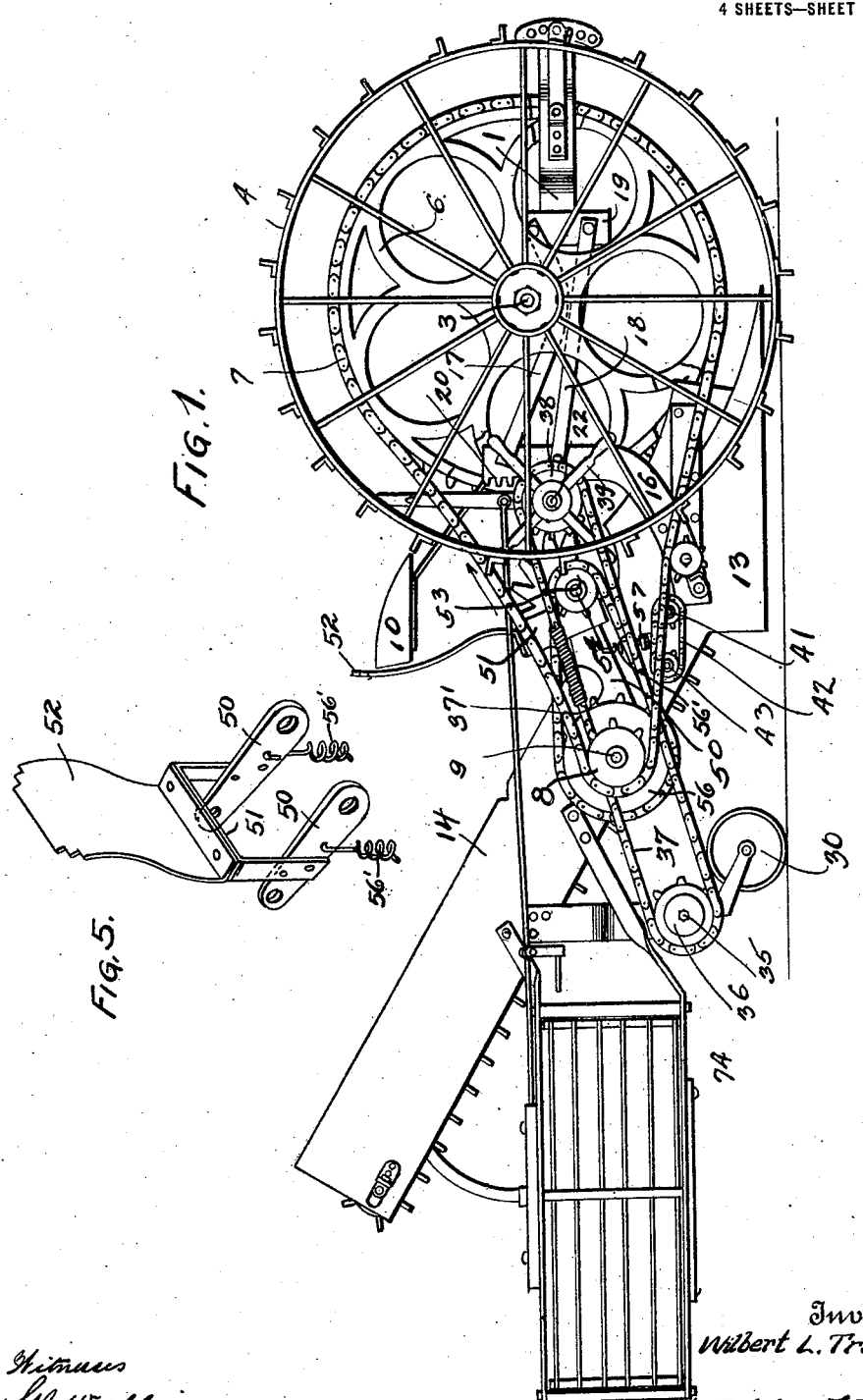

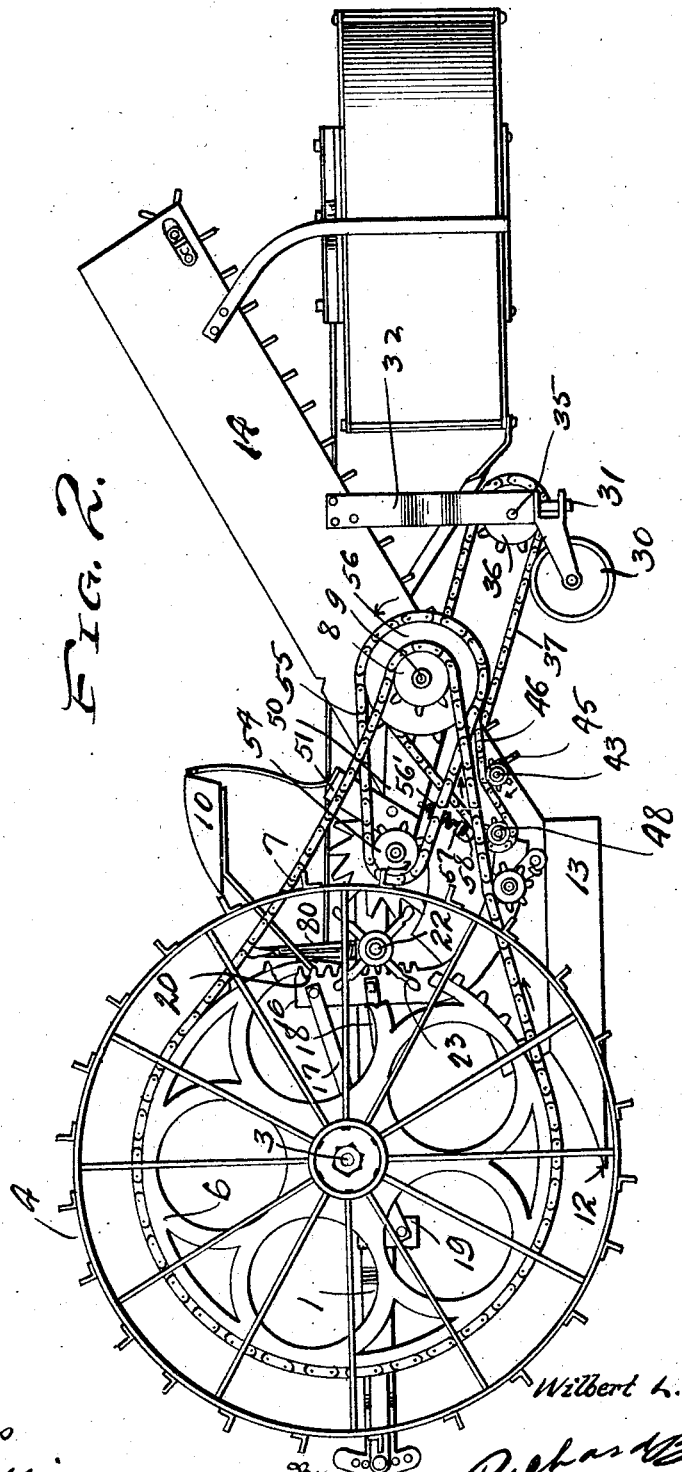

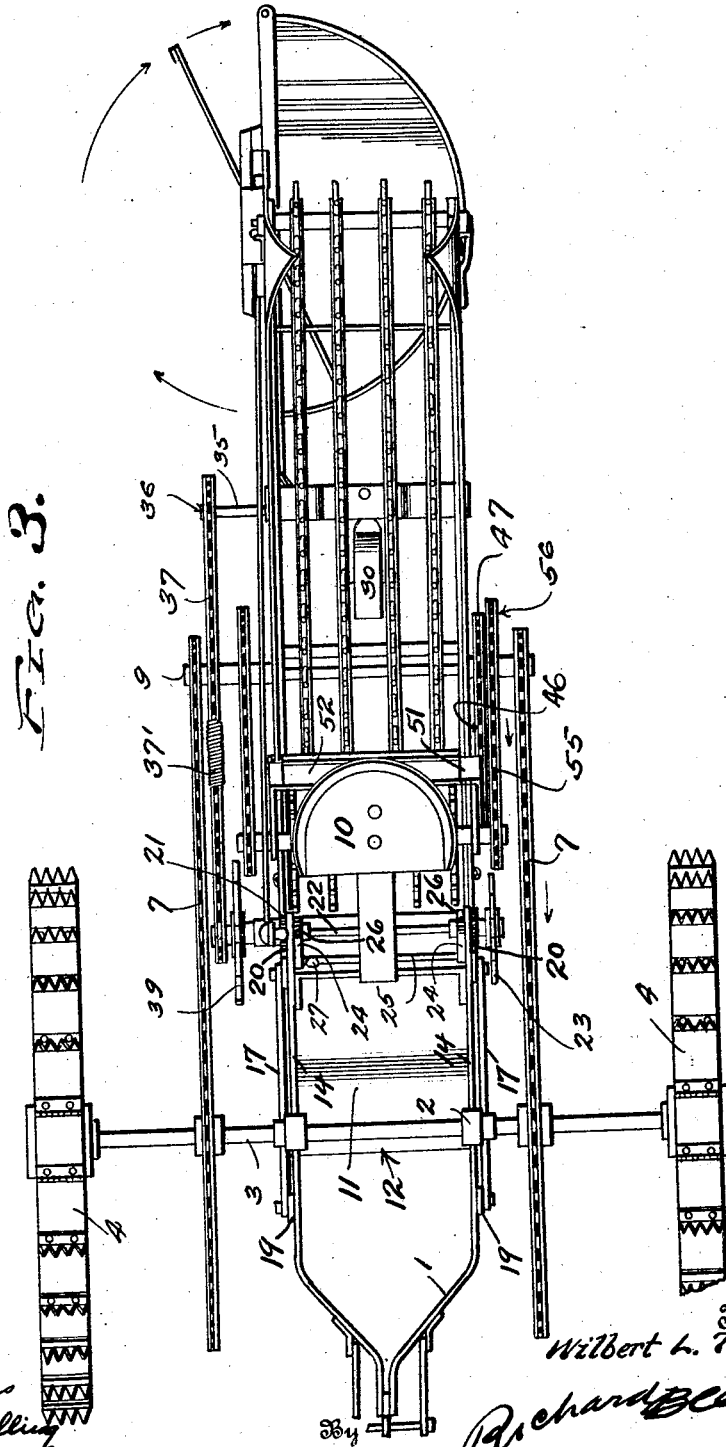

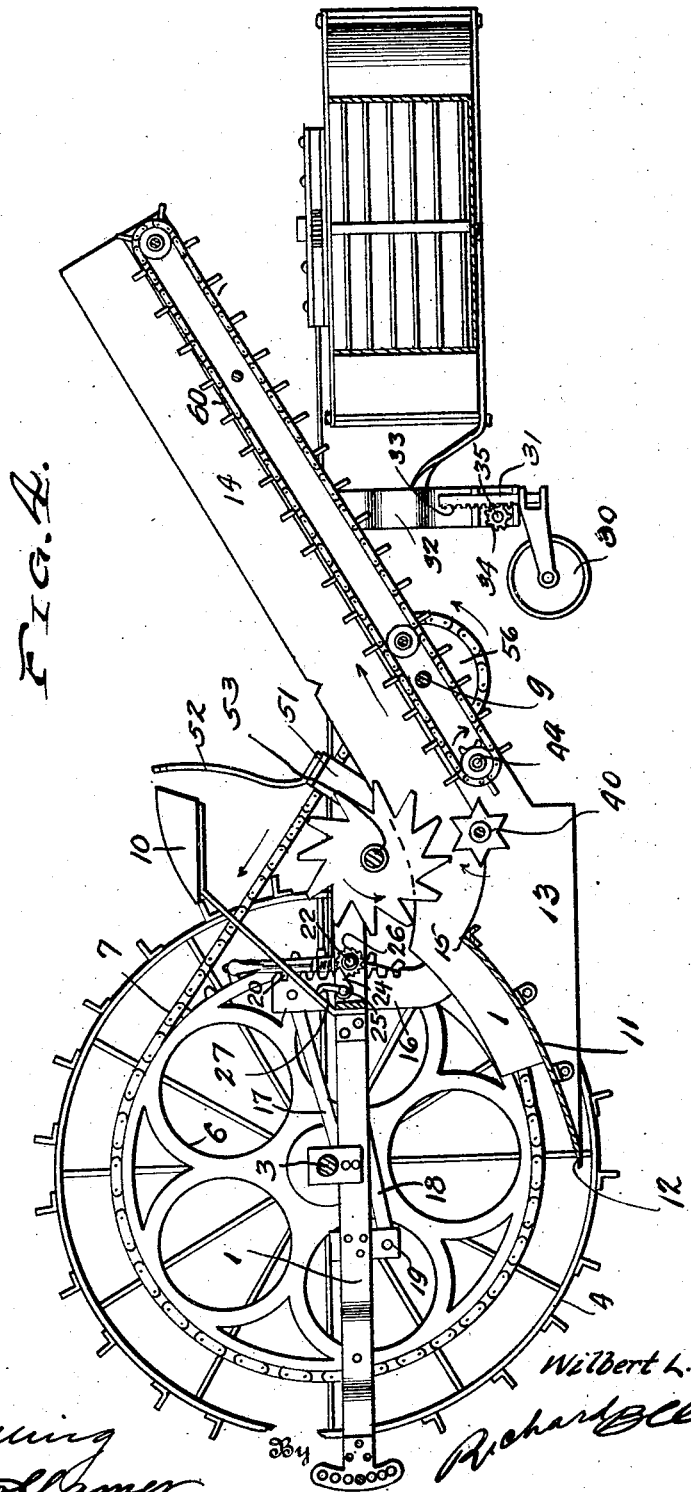

WILBERT L. TRUSSELL, OF MINNEAPOLIS, MINNESOTA.

PLOW.

1,417,643. Specification of Letters Patent. Patented May 30, 1922.

Application filed July 24, 1919. Serial No. 312,973.

*To all whom it may concern:*

Be it known that I, WILBERT L. TRUSSELL, a citizen of the United States, residing at Minneapolis, in the county of Hennepin and State of Minnesota, have invented certain new and useful Improvements in Plows, of which the following is a specification.

This invention relates to plows, and more especially to a plow adapted to dig up quack grass and other weeds with comparatively short roots, sift out the dirt, and pass the plants and weeds aside in bunches, leaving the ground ready for seeding.

A broad object of the invention is to accomplish the several objects at a single passage of the machine over the ground.

The invention includes details of structure and means of adjustment of the various parts, as hereinafter more fully described and claimed and as shown in the drawings, wherein—

Figure 1 is a right side elevation.

Figure 2 is a left side elevation.

Figure 3 a plan view and

Figure 4 a longitudinal section of this machine complete.

Figure 5 is a perspective detail of the frame work which carries the upper drum.

Across the main frame 1 at the point 2 is journaled the axle 3 to whose extremities the main wheels are connected. Fast on the axle are two large sprocket wheels 6 over which pass chains 7 leading rearward to pinions 8 on the extremities of what I will call the main shaft 9, which latter is therefore rotated quite rapidly when the machine progresses forward. A team or a tractor may be hitched to the front end of the main frame, and the operator occupies the seat 10.

The plow in the present case is in the form of a rather wide shovel 11 curved upwardly and rearwardly from its cutting edge 12 as seen in Figure 4 and mounted rigidly between two wings 13 which latter are continued upward and rearward into side boards 14 within which is disposed a carrier 60. The wings and the carrier therefore constitute a channel or trough along which the grass is conveyed, but the rear edge 15 of the shovel stands some distance forward of the front end of the carrier as seen in Figure 4 so that an opening of ample size exists through which the earth dug up by the plow and separated from the roots by the mechanism yet to be described may be dropped back onto the ground in finely comminuted condition ready for seeding.

The forward portion of this trough-like structure carries two upright arms 16 connected by parallel links 17 and 18 with blocks 19 mounted on the side bars of the main frame 1, thus permitting said forward end and the plow to be raised and lowered as desired. The adjusting mechanism herein shown consists of rack bars in the form of teeth 20 on the rear edges of said arms 16, engaging gears 21 fast on a shaft 22 journaled in bearings across the main frame, and said shaft is capable of being rotated by turning the hand wheel 23 as seen in Figure 2, although other means could be employed. Pawls 24 mounted rigidly on a shaft 25 also journaled in the main frame, engage ratchet wheels 26 fast on the shaft 22 for holding the trough when raised, and a foot trip or pedal 27 on said shaft 25 permits the raising of both pawls by the operator when it is desired to lower the rack bars and trough. Thus the shovel and the front end of the trough can be adjusted at will.

The side boards 14 pass obliquely upward from the wings, and through the former is journaled the main shaft 9 as shown in Figure 4. Said side boards, and therefore the entire carrier and the rear portion of the trough are supported by a caster wheel 30 whose stem 31 is vertically adjustable within a yoke 32 depending from the carrier so that the latter may be raised and lowered at will. While any appropriate means of adjustment might be employed, I prefer to form teeth 33 on said stem as seen in Figure 4 and a gear 34 engaging the teeth is fast on a shaft 35 bearing a sprocket wheel 36, the latter being connected by a belt 37 with another sprocket wheel 38 mounted loosely on the shaft 22 and turned by any suitable means, such as a hand wheel 39 as shown in Figure 1. I prefer to insert a spring 37′ within the upper stretch of the belt 37 so that whatever the adjustment of the front end of the trough, this belt will always reliably connect the sprockets 36 and 38. The operator by turning the hand wheel 39 can therefore cause the rise or fall of the stem 31 of the caster wheel 30 with the result that the rear end of the trough is adjusted. By raising this end and lowering the front end, it is obvious that the cutting edge 12 of the plow will be directed obliquely downward into the ground, after which adjustment of the front end of the trough will cause said cutting edge to travel at about the proper distance below the level of the ground, which I consider to be approximately four inches. By turning the hand wheels properly, the entire trough and shovel can be raised off the ground as when the device is transported from place to place. The sods and weeds dug by the shovel pass upward over it, and would drop off its rear 15 through the opening onto the ground, if it were not for means for picking them up and carrying them to the rear, which will next be described.

The comminuting mechanism consists of two toothed drums carried by the trough and between which the clods and roots pass on their way to the rear. The lower drum is in effect a roller 40 with comparatively short teeth, located as perhaps best seen in Figure 4, and fast on the right end of this roller (see Figure 1) is a sprocket wheel 41 over which a chain belt 42 leads to the rear around a sprocket 43 on the right end of the shaft of the lower roller 44 of the carrier. The left end of this shaft (see Figure 2) has a sprocket 45 underlying the chain belt 46 which leads from a drive sprocket 47 on the main shaft, the belt passing around an idle sprocket 48 on the left end of the drum shaft. By this means the main shaft transmits motion to the lower drum in the direction of the arrow in Figure 4, and also to the lower roller of the carrier.

Two arms 50 are pivotally mounted on the main shaft and connected by an arch 51 bearing a shield 52 which stands behind the operator's seat, and through the front ends of the arms is journaled the shaft 53 of the upper drum having comparatively long teeth as seen in Figure 4. Both ends of this shaft have sprockets 54 connected by belts 55 with large sprocket wheels 56 fast on the main shaft, and therefore the upper drum is rotated rapidly in the direction of the arrow shown in Figure 4. The swinging support for the shaft of this drum is made up of the two arms connected by the arch 51, and these arms are drawn normally downward with yielding force by means of springs 56' whose lower ends extend through ears 57 and receive nuts 58, so that the tension of the springs may be increased or decreased as desired. The purpose of this detail is to permit the upper toothed drum to rise in case large lumps are picked up by the shovel and fed to the comminuting mechanism, because stones or stumps might break the teeth of one of the drums.

Thus is produced a plow whose shovel has a cutting edge adjusted to travel any desired distance beneath the ground level within the limits. Scooping up the earth and with it the quack grass and other weeds, it passes then along to and between the two toothed rollers whereby the sods and clods are chopped up and the dirt dropped back onto the ground in excellent condition for seeding. These rollers or drums pass the tops and roots next to the carrier, which in turn conveys them upward and rearward.

Having thus fully described my invention, what I claim as new and desire to secure by Letters Patent, is:—

1. In a machine of the class described, the combination with a trough, gathering mechanism at the forward end thereof, conveying mechanism in the rearward portion thereof spaced from said gathering mechanism, a main frame supporting said trough, main wheels connected by an axle journaled in said frame, a main shaft journaled through said trough, and connections between said main shaft and axle; of comminuting mechanism disposed between the shovel and carrier and comprising a lower toothed drum and an upper toothed drum, connections between the shaft of the lower drum and the main shaft, arms pivotally mounted on said shaft and connected by an arch, the front ends of said arms supporting the shaft of said upper drum, a sprocket wheel on this shaft and another on the main shaft, and a chain connecting said sprockets.

2. In a machine of the class described, the combination with a trough, gathering mechanism at the forward end thereof, conveying mechanism in the rearward portion thereof spaced from said gathering mechanism, a frame supporting said trough, a shaft journaled through said trough, means for driving said shaft and an upper toothed drum located intermediate the gathering mechanism and the conveying mechanism, a lower toothed drum co-operating with said first mentioned drum, and means for driving said drums.

3. In a machine of the class described, the combination with a digging means, and a conveyer means, of a lower toothed drum supported intermediate the digging and conveying means, a rocking frame supported adjacent the conveyer means, an upper toothed drum carried by said rocking frame and means for yieldably holding said upper drum in close proximity to said lower drum.

4. A machine of the class described, comprising a digging mechanism, a conveyer mechanism, a lower toothed roller interposed between said digging and conveyer mechanism, an upper roller, a frame supporting said upper roller and means pivotally supporting said frame at its end whereby the upper roller may be moved vertically with respect to the lower roller, and means for driving both of said rollers.

5. A machine of the character described comprising a digging mechanism, a conveyer mechanism, a lower roller interposed between said digging mechanism and conveyer mechanism, an upper roller of material size, a frame supporting said upper roller, said frame being pivotally secured at its rear end upon a support, whereby said upper roller may be swung away from or toward said lower roller, and spring means anchored upon a support and engaging said frame for yieldably urging said upper roller toward said lower roller and means for driving both of said rollers.

6. In a machine of the class described the combination with a frame, a digging means, a conveyer means, of a lower crushing roller interposed between said digging and conveyer means, an upper roller, a swinging frame pivotally mounted upon said first mentioned frame and supporting said upper roller at its outer end, a shield plate supported upon said swinging frame and extending vertically in the rear of said upper roller for preventing the throwing of particles from the upper roller upon said conveyer, and means for driving both of said rollers.

7. In a machine of the class described the combination with a frame, a digging means, a conveyer means, of a lower crushing roller interposed between said digging and conveyer means, an upper roller, a swinging frame pivotally mounted upon said first mentioned frame and supporting said upper roller at its outer end, a shield plate supported upon said swinging frame and extending vertically in the rear of said upper roller for preventing the throwing of particles from the upper roller upon said conveyer, and yieldable means for urging said upper roller toward said lower roller.

8. In a machine of the class described the combination with a frame, a digging means, a conveyer means, of a lower crushing roller interposed between said digging and conveyer means, an upper roller, a swinging frame pivotally mounted upon said first mentioned frame and supporting said upper roller at its outer end, a shield plate supported upon said swinging frame and extending vertically in the rear of said upper roller for preventing the throwing of particles from the upper roller upon said conveyer, and means for regulating the tension of said yieldable means.

In testimony whereof I affix my signature in presence of two witnesses.

WILBERT L. TRUSSELL.

Witnesses:
　Aug. H. F. Gratefend,
　Marvin Jones.